(12) United States Patent
Haldewang et al.

(10) Patent No.: US 12,137,634 B2
(45) Date of Patent: Nov. 12, 2024

(54) APPARATUSES AND METHODS FOR MANAGING AGRICULTURAL CROPS

(71) Applicant: Plan Apis LLC, Syracuse, IN (US)

(72) Inventors: Anna Margaret Haldewang, Syracuse, IN (US); Benjamin David Zuiderveen, Holland, MI (US); Robert James Sullivan, II, Wyoming, MI (US); Dayna Douglas Beal, Holland, MI (US); Constantine Fanourakis, Hudsonville, MI (US)

(73) Assignee: Insighttrac, LLC, Syracuse, IN (US)

( * ) Notice: Subject to any disclaimer, the term of this patent is extended or adjusted under 35 U.S.C. 154(b) by 57 days.

(21) Appl. No.: 17/498,336

(22) Filed: Oct. 11, 2021

(65) Prior Publication Data

US 2022/0110263 A1    Apr. 14, 2022

Related U.S. Application Data

(60) Provisional application No. 63/090,457, filed on Oct. 12, 2020.

(51) Int. Cl.
*A01D 46/30* (2006.01)
*G01C 21/00* (2006.01)
(Continued)

(52) U.S. Cl.
CPC ......... *A01D 46/30* (2013.01); *G01C 21/3476* (2013.01); *G01C 21/3811* (2020.08);
(Continued)

(58) Field of Classification Search
None
See application file for complete search history.

(56) References Cited

U.S. PATENT DOCUMENTS

| 5,156 A | 6/1847 | Collyer |
|---|---|---|
| 1,784,243 A | 4/1929 | Moffet |

(Continued)

FOREIGN PATENT DOCUMENTS

| CA | 3008886 A1 | 6/2017 |
|---|---|---|
| CN | 106416624 A | 2/2017 |

(Continued)

OTHER PUBLICATIONS

European Search Report, International Search Report issued in a related application, PCT/US2021/054457, Feb. 14, 2022, 6 pages.
(Continued)

*Primary Examiner* — Amelia Vorce
*Assistant Examiner* — Kyle S Park
(74) *Attorney, Agent, or Firm* — Barnes & Thornburg LLP

(57) ABSTRACT

An apparatus for managing agricultural crops includes a vehicle and a user interface. The vehicle includes a navigation system, one or more vision systems, one or more removal tools, and a control system. The control system can include a data processing system, a data storage system, and a targeting system. The apparatus can be used to carry out one or more methods for managing agricultural crops, such as, for example, utilizing the vision system to capture images of an item to be targeted for removal by the removal tool, and utilizing the control system to process the images and position the removal tool to remove the item.

29 Claims, 7 Drawing Sheets

(51) Int. Cl.
  *G01C 21/34* (2006.01)
  *G06K 9/00* (2022.01)
  *G06K 9/62* (2022.01)
  *G06V 10/75* (2022.01)
  *G06V 20/10* (2022.01)
  *G07C 5/00* (2006.01)
  *F41B 11/80* (2013.01)
  *H04N 23/90* (2023.01)

(52) U.S. Cl.
  CPC .......... *G06V 10/751* (2022.01); *G06V 20/188* (2022.01); *G07C 5/008* (2013.01); *F41B 11/80* (2013.01); *H04N 23/90* (2023.01)

(56) References Cited

U.S. PATENT DOCUMENTS

| | | | |
|---|---|---|---|
| 2,028,217 | A | 7/1933 | Huffman |
| 2,570,511 | A | 10/1951 | Blair |
| 2,660,003 | A | 11/1953 | Farley |
| 3,606,750 | A | 9/1971 | Walker et al. |
| 3,931,914 | A | 1/1976 | Hosaka et al. |
| 4,570,854 | A | 2/1986 | Wernhart |
| 5,622,036 | A | 4/1997 | Hill |
| 6,886,445 | B2 | 5/2005 | Adams |
| 7,540,137 | B2 | 6/2009 | Gray |
| 8,024,889 | B2 | 9/2011 | Bunker |
| 9,319,903 | B1 | 4/2016 | Moffitt |
| 10,083,523 | B2 | 9/2018 | Versace et al. |
| 10,127,450 | B2 | 11/2018 | Redden et al. |
| 10,192,112 | B2 | 1/2019 | Redden et al. |
| 10,300,603 | B2 | 5/2019 | Gorshechnikov et al. |
| 10,503,976 | B2 | 12/2019 | Versace et al. |
| 10,520,482 | B2 | 12/2019 | McPeek |
| 10,555,460 | B2 | 2/2020 | Bhavani |
| 10,681,905 | B2 | 6/2020 | Tanner et al. |
| 10,716,113 | B2 | 7/2020 | Hassan et al. |
| 11,069,082 | B1 | 7/2021 | Ebrahimi Afrouzi et al. |
| 2003/0070409 | A1 | 4/2003 | Adams |
| 2009/0120050 | A1 | 5/2009 | Constans |
| 2010/0037583 | A1 | 2/2010 | Bryan, Jr. et al. |
| 2011/0137456 | A1 | 6/2011 | Koselka et al. |
| 2015/0015697 | A1 | 1/2015 | Redden et al. |
| 2016/0050852 | A1* | 2/2016 | Lee .................. B25J 9/023 901/41 |
| 2016/0202227 | A1 | 7/2016 | Mathur et al. |
| 2016/0243696 | A1 | 8/2016 | Kahani |
| 2016/0307329 | A1 | 10/2016 | Isler et al. |
| 2016/0309650 | A1* | 10/2016 | Jens .................. A01D 46/30 |
| 2016/0353661 | A1 | 12/2016 | Caldeira et al. |
| 2017/0325444 | A1 | 11/2017 | Crinklaw et al. |
| 2018/0025480 | A1* | 1/2018 | Dingle .............. G01N 21/84 382/110 |
| 2019/0166764 | A1 | 6/2019 | Pitzer et al. |
| 2019/0166765 | A1 | 6/2019 | Maor |
| 2019/0261566 | A1* | 8/2019 | Robertson ......... G06V 20/10 |
| 2021/0186006 | A1* | 6/2021 | Sibley .............. G05D 1/0044 |
| 2022/0330468 | A1* | 10/2022 | Underwood ...... G06V 20/188 |

FOREIGN PATENT DOCUMENTS

| | | |
|---|---|---|
| CN | 110432244 A | 11/2019 |
| EP | 2140751 B1 | 2/2012 |
| FR | 3001101 A1 | 7/2014 |
| GB | 450462 | 8/1936 |
| GB | 1470693 | 4/1977 |
| WO | 2013102213 A1 | 7/2013 |
| WO | 2018087546 A1 | 5/2018 |
| WO | 2018092135 A1 | 5/2018 |
| WO | 2018167784 A1 | 9/2018 |
| WO | 2021126472 A1 | 6/2021 |

OTHER PUBLICATIONS

European Search Report, Written Opinion issued in a related application, PCT/US2021/054457, Feb. 14, 2022, 13 pages.

Roy, Pravakar, Abhijeet Kislay, Patrick A. Plonski, James Liby, Volkan Isler, "Vision-Based Preharvest Yield Mapping for Apple Orchards", 2019, 29 pages, Elsevier, downloaded from the internet on Oct. 24, 2022, https://www.sciencedirect.com/science/article/abs/pii/S0168169919303436?fr=RR-2&ref=pdf_download&rr=75f2d869bde6873b.

* cited by examiner

APPARATUSES AND METHODS FOR MANAGING AGRICULTURAL CROPS

The present invention relates to apparatuses and methods for managing agricultural crops, and, in particular to methods and apparatuses for removing items from trees and plants.

BACKGROUND AND SUMMARY OF THE INVENTION

Certain apparatuses and methods for managing agricultural crops are known in the art. For example, it may be desirable to use an apparatus to remove one or more items, such a fruit or almond mummies, from trees. Examples of such prior art apparatuses can be found, for example, in U.S. Pat. No. 7,540,137 which discloses an automated fruit harvester. U.S. Pat. No. 4,570,854 discloses an agricultural aerial apparatus to remove mummies from almond trees. U.S. Patent Application Publication No. 2003/0070409 discloses a fruit picking assembly including a water cannon to selectively impact fruit to be picked with a water slug to detach the fruit from the tree.

In one embodiment of the present invention, an apparatus for managing agricultural crops includes a vehicle, a navigation system, a vision system, a removal tool, and a control system. The control system includes a processing system and a data storage system.

In one embodiment, the navigation system includes a GPS system.

In certain embodiments, the vision system includes a camera. In another embodiment, the vision system includes a light source.

In other embodiments, the vision system includes a first camera and a second camera. In certain embodiments, the first camera is located above the second camera.

In one embodiment, the removal tool includes a turret. In another embodiment, the removal tool includes a projectile launcher.

In certain embodiments, the processing system includes a machine learning program.

In one embodiment, the data storage system includes at least one image of a type of item to be removed by the removal tool. In other embodiments, the control system includes a targeting system.

In one embodiment, the apparatus further includes a proximity sensor.

In other embodiments, the apparatus includes a user interface.

In one embodiment of the present invention, a method of managing an agricultural crop includes, obtaining a map of the crop to be managed, utilizing the map and a navigation system to move a vehicle through the crop, specifying a type of item to be removed from the crop, storing an image of the type of item to be removed in a data storage system, capturing an image of a portion of the crop, comparing the captured image with the stored image and determining whether the captured image includes the type of item to be removed from the crop, if the captured image includes the type of item to be removed from the crop, aiming a removal tool at the item to be removed from the crop shown in the captured image, and attempting to remove the item to be removed from the crop shown in the captured image by activating the removal tool.

In one embodiment, the removal tool is aimed by utilizing a LIDAR system to obtain a three dimensional image of the item to be removed shown in the captured image and overlaying the three dimensional image on the captured image.

In another embodiment, activating the removal tool launches a projectile at the item to be removed from the crop shown in the captured image. In certain embodiments, the method further includes determining the expected vertical drop of the projectile as it travels toward the item to be removed from the crop shown in the captured image, and aiming the removal tool to account for the expected drop.

In other embodiments, the method includes downloading the map to the vehicle. In one embodiment, the map includes a predetermined route for the vehicle to follow.

In certain embodiments, the method includes storing in the data storage system an image of a second type of item other than the type of item to be removed from the crop. in other embodiments, the method includes comparing the captured image to the image of the second type of item to determine if the captured image includes the second type of item.

In one embodiment, the method includes storing the captured image in the data storage system.

In another embodiment, the method includes capturing a second image of the portion of the crop and comparing the second captured image to the first captured image to determine if the item to be removed from the crop shown in the first captured image was removed by the removal tool. In one embodiment, the method includes activating the removal tool a second time if the item to be removed from the crop shown in the first captured image was not removed by the first activation of the removal tool. In certain embodiments, the image of the item to be removed is stored in the data storage system if the item to be removed from the crop shown in the first captured image was not removed. In one embodiment, the method includes analyzing the image of the item to be removed from the crop and modifying the method based on the analysis.

In certain embodiments, the method includes utilizing a vision system to obtain information about the crop as the vehicle moves through the crop.

In another embodiment, the method includes generating a report of the condition of the crop.

In certain embodiments, the method includes, generating a report of the activities carried out during the method.

In one embodiment of the present invention, a method of managing an agricultural crop includes obtaining a map of the crop to be managed, utilizing the map and a navigation system to move a vehicle through the crop, specifying a type of item to be removed from the crop, storing an image of the type of item to be removed in a data storage system, capturing a first image of a portion of the crop with a first camera, capturing a second image of the portion of the crop with a second camera, and comparing the first image with the stored image and determining whether the first image includes the type of item to be removed from the crop. If the first image includes the type of item to be removed from the crop, the method includes rectifying the first image and the second image, aligning the first image and the second image horizontally, translating the coordinates of the item to be removed from the crop in the first image to account for rectification of the images, defining a virtual boundary around the item to be removed from the crop in the first image, extracting a visual feature located inside the boundary, and reviewing the second image for a visual feature corresponding to the visual feature extracted from the first image. If the second image includes a visual feature corresponding to the visual feature extracted from the first image, the method includes filtering the corresponding visual features and confirming that the matching visual features appear on the surface the item to be removed from the crop in both images, determining if the corresponding visual features appear on a common horizontal line in the first and second images, and if so, calculating the pixel difference between the first image and the second image and determining a raw pixel shift value, determining a conversion factor and converting the raw pixel shift value to a depth estimate, utilizing the x,y coordinates of the item to be removed from the crop shown in the first image, calculating a depth estimate for the location of the item to be removed from the crop shown in the first image, mapping in three dimensional space the location of the item to be removed from the crop shown in the first image in relation to the position of a removal tool, aiming a removal tool at the item to be removed from the crop shown in the first image, and attempting to remove the item to be removed from the crop shown in the first image by activating the removal tool.

In one embodiment, the first image and the second image are captured simultaneously.

In another embodiment, activating the removal tool launches a projectile at the item to be removed from the crop shown in the first image. In certain embodiments, the method includes determining the expected vertical drop of the projectile as it travels toward the item to be removed from the crop shown in the first image and aiming the removal tool to account for the expected drop.

In other embodiments, the method includes downloading the map to the vehicle. In one embodiment, the map includes a predetermined route for the vehicle to follow.

In certain embodiments, the method includes storing in the data storage system an image of a second type of item other than the type of item to be removed from the crop. In other embodiments, the method includes comparing the first image to the image of the second type of item to determine if the first image includes the second type of item.

In one embodiment, the method includes storing the first image in the data storage system.

In other embodiments, the method includes capturing a third image of the portion of the crop and comparing the third image to the first image to determine if the item to be removed from the crop shown in the first image was removed by the removal tool. In one embodiment, the method includes activating the removal tool a second time if the item to be removed from the crop shown in the first image was not removed by the first activation of the removal tool. In another embodiment, the image of the item to be removed is stored in the data storage system if the item to be removed from the crop shown in the first image was not removed. In one embodiment, the method includes analyzing the image of the item to be removed from the crop and modifying the method based on the analysis.

In certain embodiments, the method includes utilizing a vision system to obtain information about the crop as the vehicle moves through the crop.

In one embodiment, the method includes generating a report of the condition of the crop.

In other embodiments, the method includes generating a report of the activities carried out during the method.

In one embodiment of the present invention, a method of identifying the location of an item includes specifying a type of item to be identified, storing an image of the type of item to be identified in a data storage system, capturing a first image of an area with a first camera, capturing a second image of the area with a second camera, and comparing the first image with the stored image and determining whether the first image includes the type of item to be identified. If the first image includes the type of item to be identified, the method includes rectifying the first image and the second image, aligning the first image and the second image horizontally, translating the coordinates of the item to be identified in the first image to account for rectification of the images, defining a virtual boundary around the item to be identified in the first image, extracting a visual feature located inside the boundary, and reviewing the second image for a visual feature corresponding to the visual feature extracted from the first image. If the second image includes a visual feature corresponding to the visual feature extracted from the first image, the method includes filtering the corresponding visual features and confirming that the matching visual features appear on the surface the item to be identified in both images, determining if the corresponding visual features appear on a common horizontal line in the first and second images, and if so, calculating the pixel difference between the first image and the second image and determining a raw pixel shift value, determining a conversion factor and converting the raw pixel shift value to a depth estimate, utilizing the x,y coordinates of the item to be identified shown in the first image, calculating a depth estimate for the location of the item to be identified shown in the first image, and mapping in three dimensional space the location of the item to be identified shown in the first image.

In one embodiment, the method includes generating a report of the location of the item to be identified.

In another embodiment, the method includes marking the item to be identified. In one embodiment, the method includes marking an area adjacent the item to be identified.

In one embodiment of the present invention, a method of identifying an item includes specifying a type of item to be identified, storing an image of the type of item to be identified in a data storage system, capturing an image of a location, and comparing the captured image with the stored image and determining whether the captured image includes the type of item to be identified.

DETAILED DESCRIPTION OF EMBODIMENTS OF THE INVENTION

Figure 1:
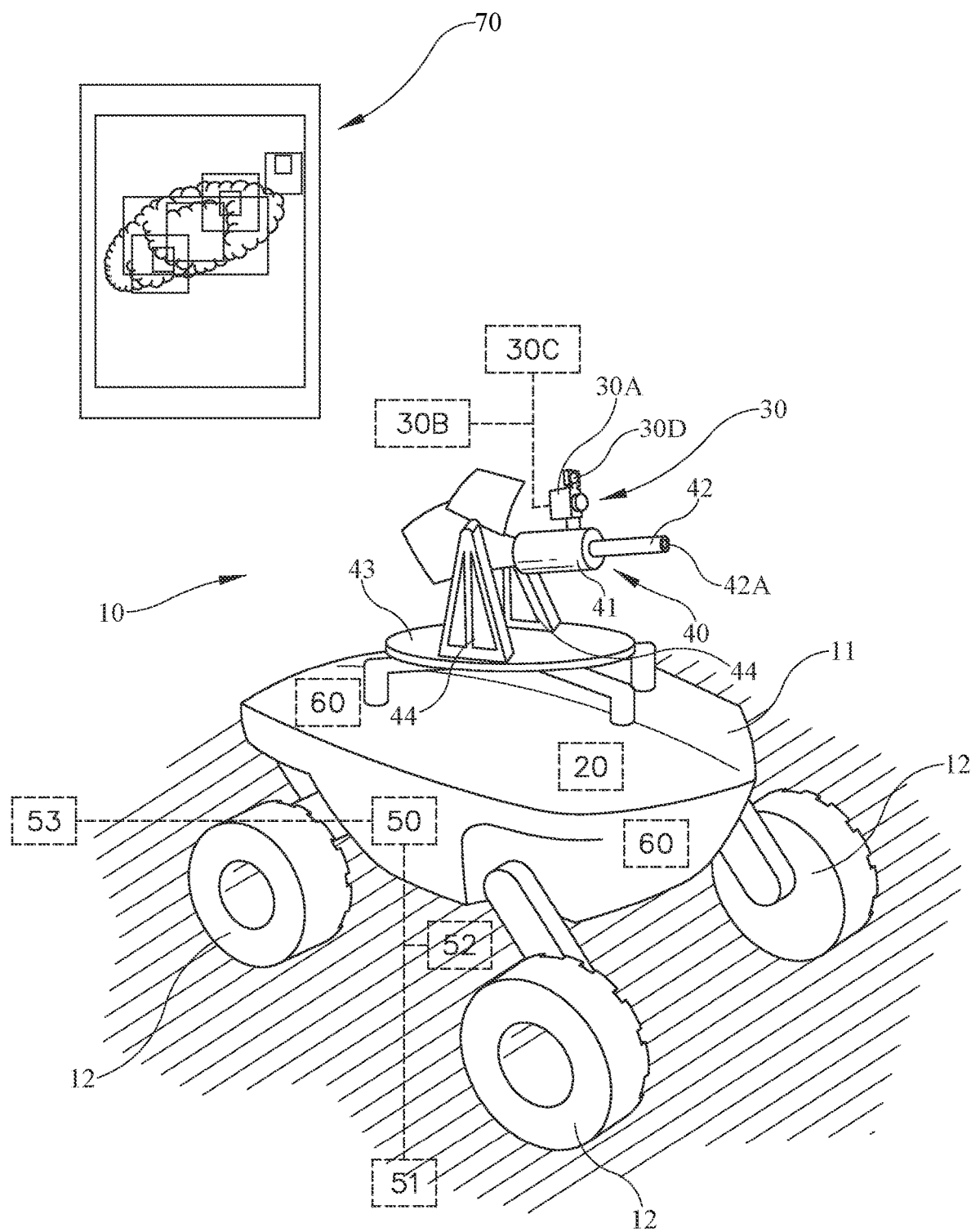
FIG. 1 is a perspective view of a vehicle that is a component of an apparatus for managing agricultural crops according to one embodiment of the present invention.

Referring to FIG. 1, an apparatus for managing agricultural crops according to one embodiment of the present invention includes a vehicle 10 and a user interface 70. In the embodiment shown, vehicle 10 includes a body 11, wheels 12, a navigation system 20, a vision system 30, a removal tool 40, a control system 50 and one or more proximity sensors 60.

In the embodiment shown, vehicle 10 is an autonomous vehicle, i.e., vehicle 10 does not require a driver but instead moves through a field or orchard in accordance with a previously mapped route or remotely provided instructions, as described below. Vehicle 10 can be electric, gasoline powered, diesel powered, solar powered, or powered by other means sufficient to propel vehicle 10 through a field or orchard and to provide sufficient power to the various electronic systems on vehicle 10 discussed below.

In the embodiment shown, navigation system 20 is an onboard navigation system housed within body 11 of vehicle 10. In one embodiment of the invention, navigation system 20 is a global positioning system (GPS) of the type commonly used in, for example, motor vehicles. Navigation system 20 may also optionally include a LIDAR system that is used to assist in navigation of vehicle 10 as described below, such as, for example, by identifying obstacles in the planned path of travel of vehicle 10. The LIDAR system used with the remainder of navigation system 20 can either be a LIDAR system dedicated to that purpose or the LIDAR system that is part of vision system 30 described below.

In the embodiment shown, vision system 30 includes a camera 30A, a LIDAR system 30B, a light sensor 30C, and a light source 30D. Camera 30A can be of any type suitable for taking images of the plants, trees and crops in a field or orchard. Preferably, camera 30A is capable of taking multiple, high resolution images in rapid succession. In one embodiment of the invention, camera 30A is capable of taking at least 6-10 images per second at a resolution of at least 3840×2160 pixels. In other embodiments, camera 30A is a high definition video camera. As described in more detail below, LIDAR system 30B is used in connection with targeting of removal tool 40 and, in particular, is used to determine the distance from removal tool 40 to the item to be removed. Light sensor 30C senses the ambient light level during operation of vehicle 10 and turns on light source 30D when additional light is useful or necessary for performing the tasks described herein.

Removal tool 40, in the embodiment shown, includes a projectile launcher 41 having a barrel 42 having an end 42A, a turret 43 and support members 44. In certain embodiments of the invention, projectile launcher 41 utilizes compressed air to launch projectiles from end 42A of barrel 42 as described below. Turret 43 rotates, preferably 360 degrees, so that vision system 30 (which is mounted to projectile launcher 41) and barrel 42 of projectile launcher 41 can be aimed in a complete circle around vehicle 10. Projectile launcher 41 is pivotally mounted to support members 44 such that barrel 42 of projectile launcher 41 can pivot to aim barrel 42 along an arc formed by end 42A of barrel 42 as projectile launcher 41 pivots up and down. Turret 43 can be rotated and projectile launcher 41 can be pivoted using any number of known mechanical means, such as, for example, an electric motor and gear system.

Control system 50, in the embodiment shown, includes a processing system 51, a data storage or memory system 52, and a targeting system 53. In certain embodiments of the invention, processing system 51 includes a computer processor and an artificial intelligence system, such as, for example, a machine learning program. Data processing system 51 can be preprogramed to perform the functions described herein. Data storage system 52 in various embodiments of the invention can include one or more of a hard drive disk, compact disk, secure digital card or other known data storage devices. In other embodiments, data storage system 52 is a cloud based system with which processing system 51 communicates wirelessly. Data useful for carrying out the functions described herein can be stored in data storage system 52. Targeting system 53 includes software and mechanical components for controlling the motion of projectile launcher 41 and turret 43. In certain embodiments of the invention, targeting system 53 includes a motor, motor controller, and associated software.

One or more proximity sensors 60 can be placed at desired locations on vehicle 10 to sense when vehicle 10 is approaching a person or other object. Proximity sensors 60 communicates with control system 50 to determine when vehicle 10 is undesirably close to a person or object. When this occurs, control system 50 will cause vehicle 10 to stop moving and/or change position so as to avoid the person or object. In one embodiment of the invention, proximity sensors 60 are of the type commonly used in motor vehicles.

User interface 70 is used to control and communicate with vehicle 10, navigation system 20, and/or control system 50. For example, user interface 70 can be used to determine the operational status of vehicle 10, the location of vehicle 10, to transmit instructions to vehicle 10, and to receive data from vehicle 10 as vehicle 10 moves through the field or orchard. In one embodiment of the present invention, user interface 70 is a tablet computer. In other embodiments of the present invention, user interface 70 is a cellular telephone, a desk top computer, or other device, including such devices equipped with an app. User interface 70 can communicate with vehicle 10, navigation system 20 and/or control system 50 by any one of a number of known means, such as by Wi-Fi, cellular or Bluetooth communications means. User interface 70 can be used to map an orchard or field in which vehicle 10 will operate. For example, user interface 70 can be used to acquire a topographical map of a particular orchard through use of Google maps or other maps available in digital or other electronic format. The user can the map waypoints or otherwise specify the route for vehicle 10 to follow.

One method of managing agricultural crops according to one embodiment of the present invention will now be described in connection with almond orchards. Specifically, almonds left on a tree after harvest are known as "mummies." Mummies are undesirable because they can rot (thereby spreading disease to the tree), become a breeding and/or nesting location for destructive insects, and otherwise interfere with production of nuts during the growing season.

Figure 3:
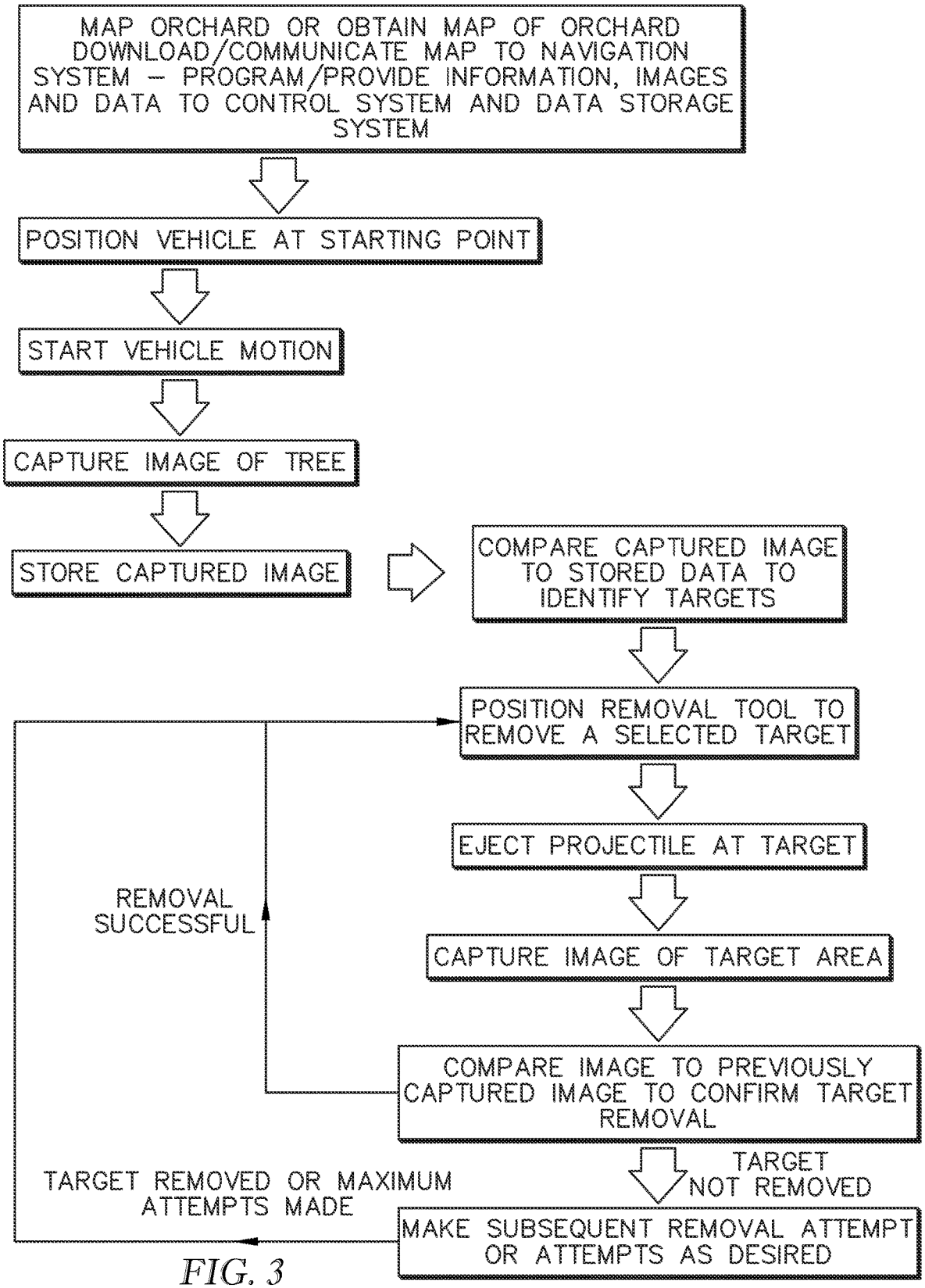
FIG. 3 is a flow chart of a method of managing agricultural crops according to one embodiment of the present invention.

FIG. 3 is a flow chart of certain steps of a method of managing agricultural crops according to one embodiment of the present invention. In one embodiment of the present invention, user interface 70 is used to map an almond orchard as described above. An almond orchard, like other orchards, typically includes multiple generally parallel spaced apart rows of spaced apart trees. The map acquired or produced by user interface 70 may be downloaded to navigation system 20 of vehicle 10 or communicated wirelessly to navigation system 20 as vehicle 10 travels through the orchard. The map may include a preprogrammed route for vehicle 10 to follow.

Data and appropriate programming are downloaded or otherwise provided to control system 50. For example, a library of various images, such as images of almonds, mummies, almond leaves, almond blossoms, almond buds, and almond tree bark, can be stored in data storage system 52, and processing system 51 can be programmed with an image comparison program that will compare images captured by vision system 30 (as described below) with the image library.

After the orchard is mapped and control system 50 is programed and provided with the desired data, vehicle 10 is positioned at a desired starting point in the orchard, such as at the end of and between two rows of trees. Vehicle 10 is then put in motion and is guided by navigation system 20 through the orchard between the rows of tress in accordance with the map and preprogrammed route. In certain embodiments of the invention, navigation system 20 directs vehicle 10 down the center of the space between each row of trees.

As vehicle 10 travels through the orchard, camera 30A takes multiple images of each tree in rapid succession. Note that turret 34 and can be rotated and projectile launcher 41 can be pivoted such that, in conjunction with moving vehicle 10, camera 30A can capture images of the entire tree. Processing system 51 compares the images captured by camera 30A with images in the image library stored in data storage system 52 and identifies mummies for removal by removal tool 40. In certain embodiments of the invention, control system 50 saves the images of the mummies in the image library in data storage system 52 for use in the future. In other embodiments, processing system 51 also identifies images of almonds, almond leaves, almond blossoms, almond buds, and almond tree bark and stores them in the image library in data storage system 52 for future use.

Figure 2:
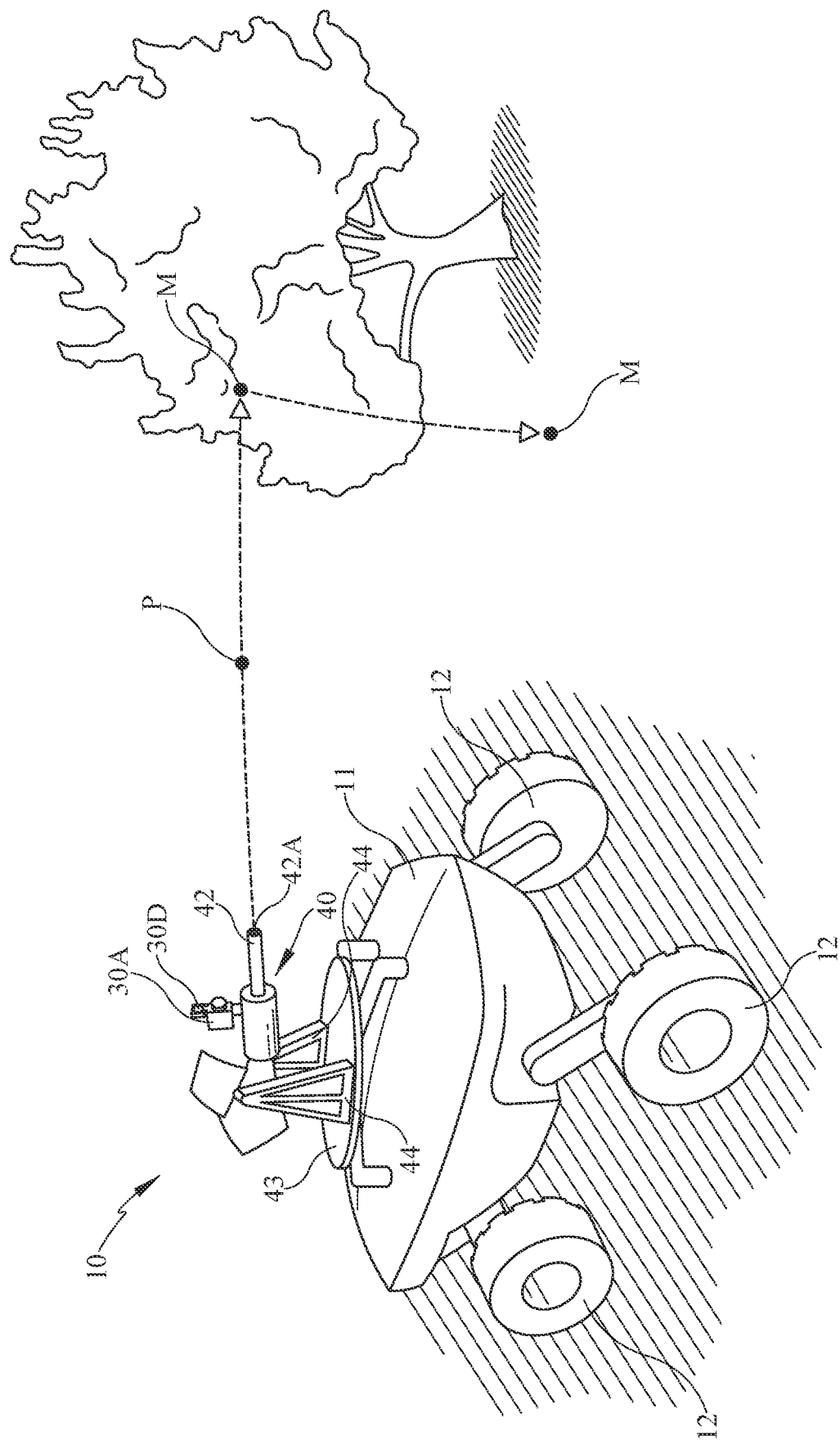
FIG. 2 is a perspective view of the vehicle of FIG. 1 targeting an item for removal from a tree according to one method of managing agricultural crops according to the present invention.

When a target mummy M is identified for removal, processing system 51 directs targeting system 53 to move projectile launcher 41 by rotating turret 43 and pivoting projectile launcher 41 into a position from which projectile launcher 41 can launch a projectile P, such as a biodegradable pellet, at target mummy M to contact target mummy M with sufficient force to dislodge it from the tree. (FIG. 2) Projectile launcher 41 is aimed by overlaying one or more three dimensional images of target mummy M and the surrounding area produced by LIDAR system 30B on one or more the two dimensional images of target mummy M captured by camera 30A. Processing system 51 determines the height of target mummy M and the distance that target mummy M is from vehicle 10. In certain embodiments of the invention, processing system 51 and targeting system 53 position projectile launcher 41 and determine a projectile ejection force and velocity so as to utilize the minimum projectile velocity needed to remove target mummy M, and to take into account the expected vertical drop of projectile P due to gravitational forces as projectile P travels toward target mummy M. Reducing the velocity of projectile P helps prevent damage to and removal of parts of the tree adjacent target mummy M, such as almonds, almond leaves, almond blossoms, almond buds, and almond tree bark. In certain embodiments of the present invention, projectile P is launched at a velocity of between 150 feet per second and 450 feet per second. After positioning projectile launcher 41 and selecting the ejection force, control system 50 triggers projectile launcher 41, which ejects a projectile P at target mummy M.

After projectile P is ejected, camera 30A captures another image of the area of the tree on which target mummy M was originally located. Processing system 51 compares this image with previously captured images to confirm that target mummy M has been removed. If the comparison shows that target mummy M was not successfully removed, another attempt will be made to remove target mummy M. This can continue until either (a) target mummy M is successfully removed or (b) for a predetermined maximum number of attempts. If target mummy M is not successfully removed after a predetermined number of attempts, an image of target mummy M is stored in data storage system 52 and identified as having not been removed. After either successful removal of target mummy M or after the maximum preselected number of removal attempts have occurred, the next mummy identified for removal is targeted and removal attempts are initiated in the same manner as described above. Vehicle 10 proceeds through the orchard in this manner.

As vehicle 10 moves through the orchard performing the tasks discussed above, vision system 30 can gather various information about the condition of the orchard for storage and processing by processing system 51 and data storage system 52. For example, vision system 30 can count the number of mummies successfully removed, the number of mummies that were not successfully removed, the number of buds, blossoms, and nuts on the trees, the locations of the mummies, buds, blossoms and nuts, and other information.

When vehicle 10 has completed its travel through the orchard, it can return to any desired location, where it can be reprogrammed for future use, recharged, refueled and/or otherwise serviced for future use. Control system 50 can generate a report of data and activities for the user. The report can be downloaded from control system 50 and/or transmitted wirelessly to user interface 70 or another device. The report can include any desired information collected, such as the number of mummies removed, the time that vehicle 10 spent in each area of the orchard, the areas of the orchard with the greatest number or density of mummies, the locations of the mummies in the orchard, and other data. The data can be reported in any desired format, such as words, charts, graphs, maps, and/or tables.

Data processing system 51 and data storage system 52 can be used both to improve operation of the apparatus and to extrapolate other data and information. For example, images of targeted mummies that were not successfully removed can be analyzed (and studied by the user) to determine if there are certain conditions relating to these mummies that make them more difficult to remove. Changes can then be made to the targeting and removal process. The images of mummies successfully removed can also be reviewed and analyzed to confirm that the objects removed were, in fact, mummies, as opposed to nuts, blossoms, buds, leaves, bark or other objects. Any images of objects erroneously removed can be stored in data storage system 52 and identified as an image of an item type that should not be targeted for removal in the future. The data collected can also be used to estimate the savings to the grower resulting from crop damage prevented based on the number of mummies removed. The data can also alert the grower that certain areas of the orchard are candidates for investigation and study. For example, the grower may want to study areas of the orchard that have a high concentration of mummies to determine if there are conditions responsible for the increased concentration of mummies.

Figure 4:
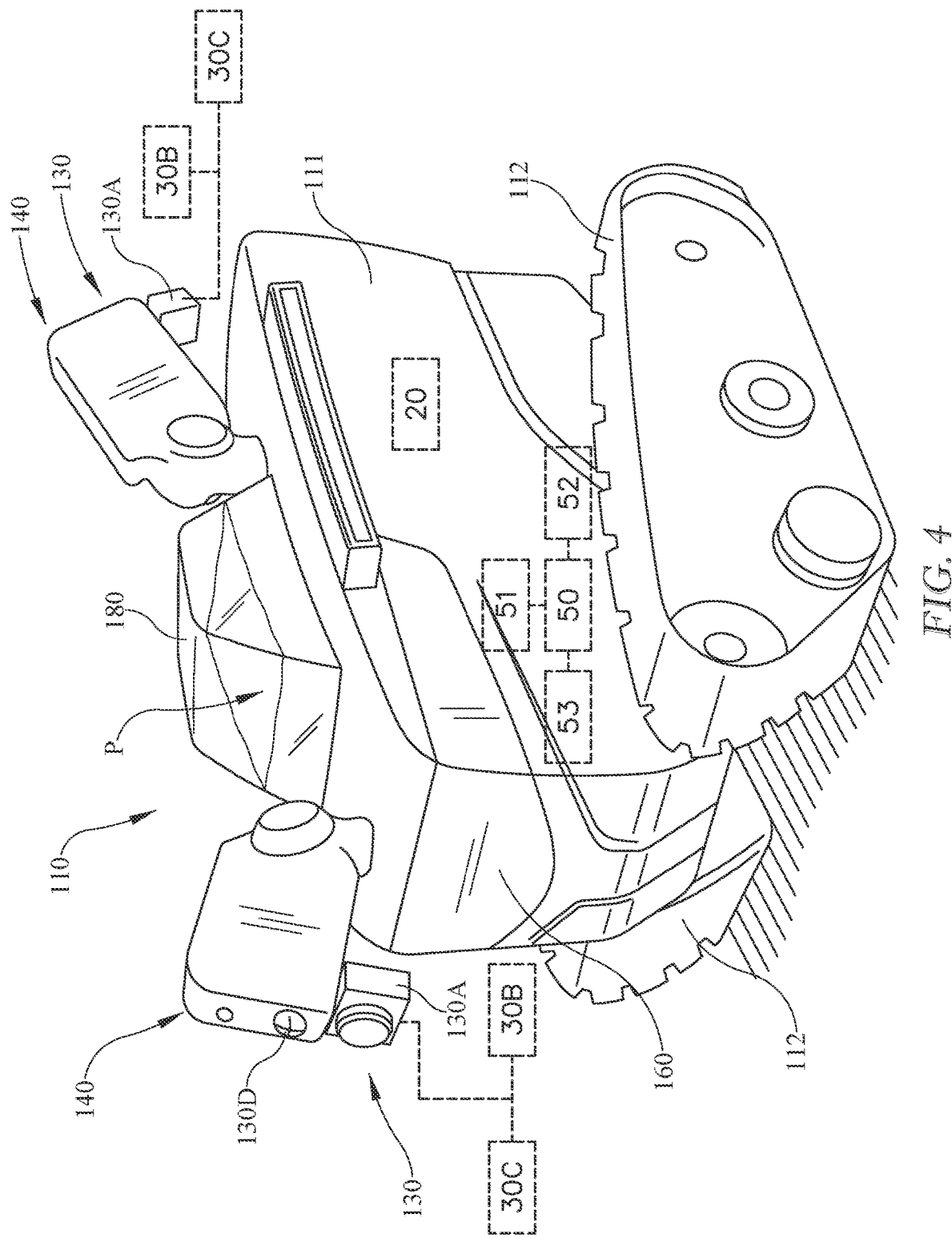
FIG. 4 is a perspective view of a vehicle that is a component of an apparatus for managing agricultural crops according to another embodiment of the present invention.

FIG. 4 is a perspective view of a vehicle that is a component of an apparatus for managing agricultural crops according to another embodiment of the present invention. In the embodiment shown, vehicle 110 is provided with tracks 112 instead of wheels. Vehicle 110 is also provided with two vision systems 130 and two removal tools 140, which are positioned at the front and rear of vehicle 110. Vision systems 130 each include a camera 130A and a light source 130D. Vision systems 130 and removal tools 140 can be operated at the same time or independently. Vehicle 110 includes a navigation system 20, control system 50, and one or more proximity sensors 60. Vehicle 110 also includes one or more proximity sensors 160. A storage area 180 is provided for holding projectiles P.

Figure 5:
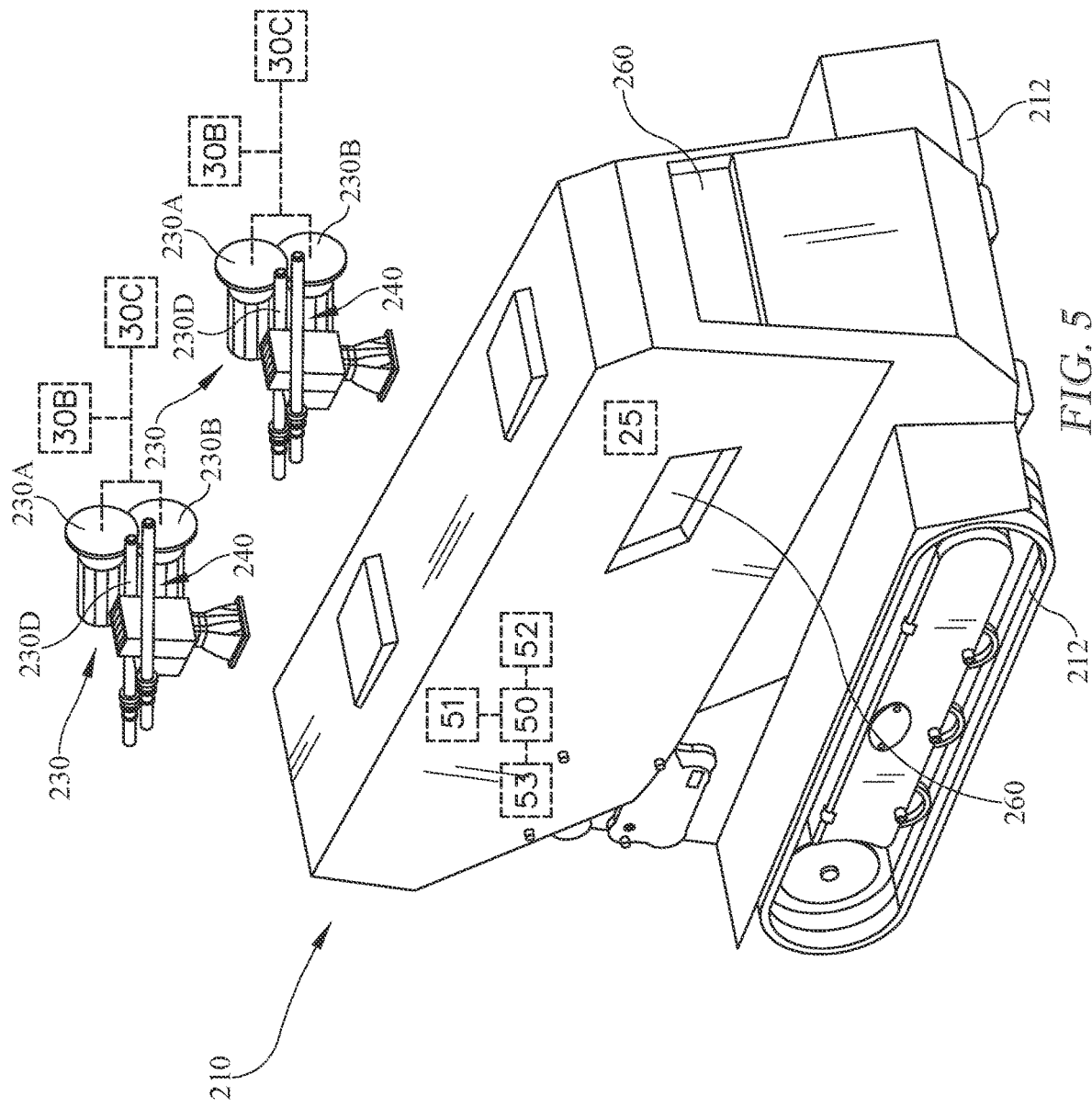
FIG. 5 is a perspective view of a vehicle that is a component of an apparatus for managing agricultural crops according to another embodiment of the present invention.

FIG. 5 is a perspective view of a vehicle that is a component of an apparatus for managing agricultural crops according to another embodiment of the present invention. In the embodiment shown, vehicle 210 is provided with tracks 212. Vehicle 210 is also provided with two vision systems 230 and two removal tools 240, which are positioned at the front and rear of vehicle 210. Each vision system 230 includes a first or upper camera 230A, a second or lower camera 230B, a light source 230D. Vision systems 230 and removal tools 240 can be operated at the same time or independently. Unlike vision system 30 described above, vision system 230 does not utilize LIDAR. Instead, vision system 230 is a stereovision system, as described in greater detail below. This embodiment also includes one or more proximity sensors 260. Vehicle 210 includes a navigation system 20, control system 50, and one or more proximity sensors 60.

Figure 6:
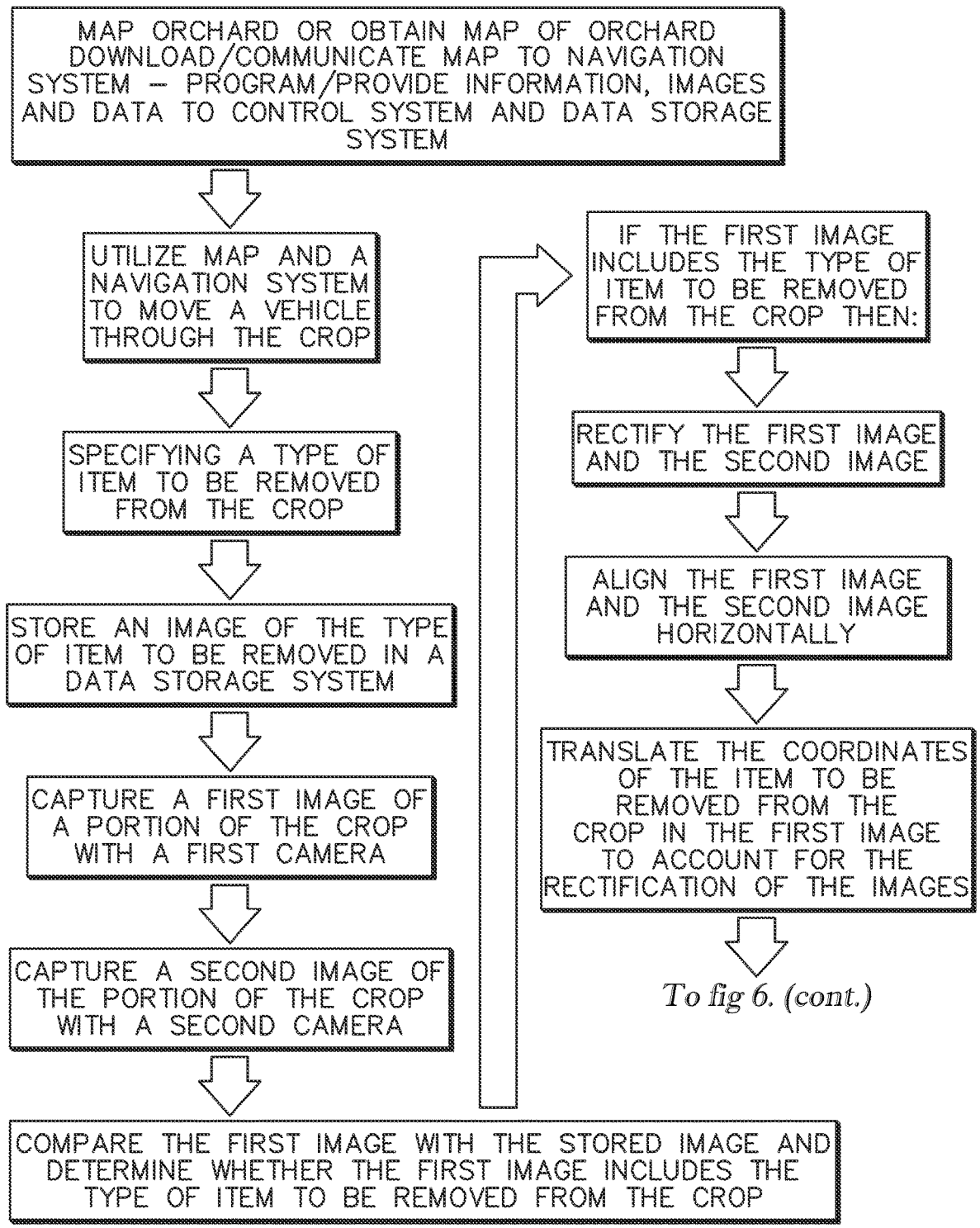
FIG. 6 is a flow chart of a method of managing agricultural crops according to another embodiment of the present invention.
Figure 6:
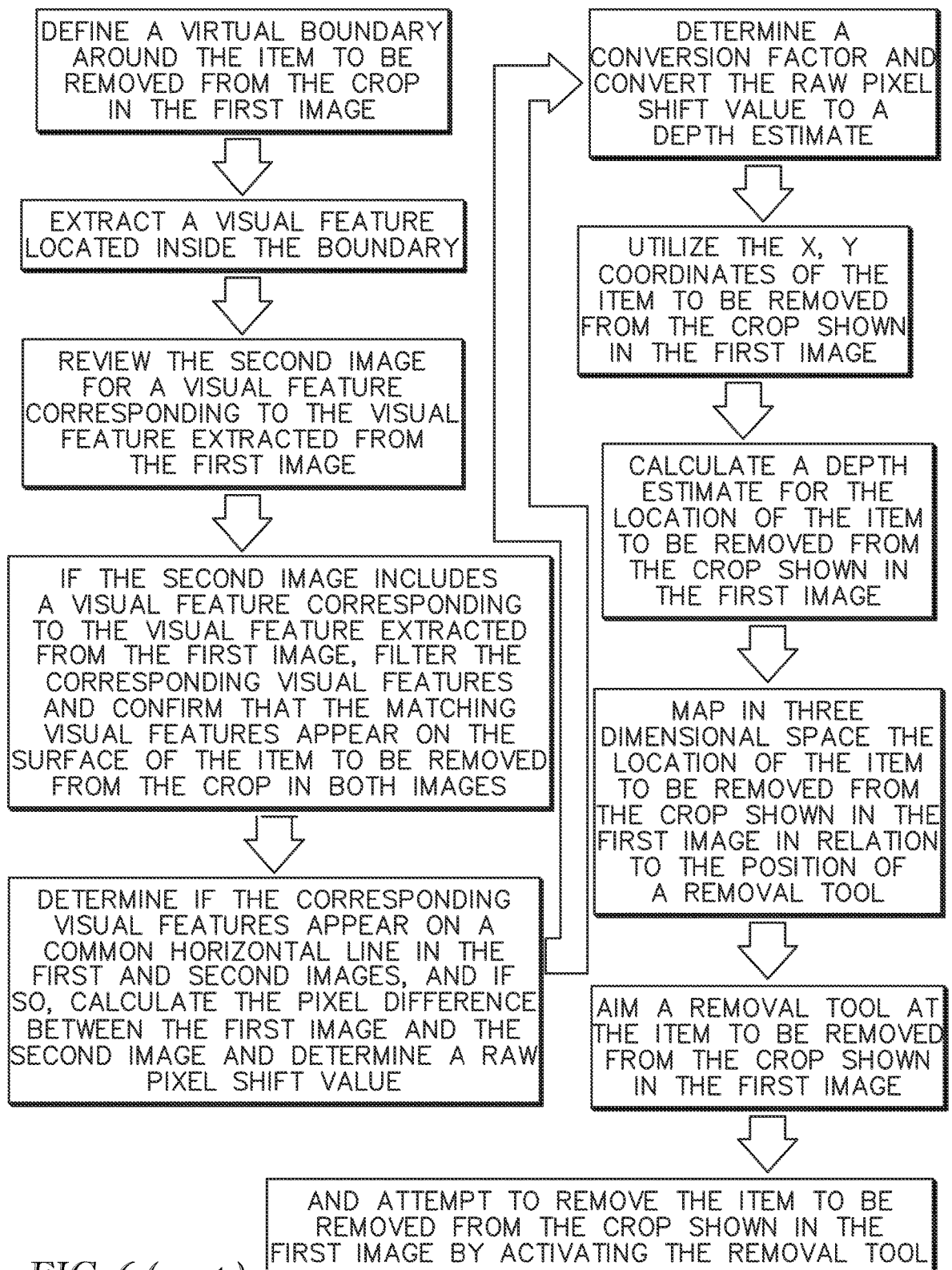

Vehicle 210 can be utilized to perform another method of managing agricultural crops according to one embodiment of the present invention, certain steps of which are outlined in FIG. 6. In this embodiment, an almond orchard, for example, can be mapped as described above, and navigation system 20 can be used to guide vehicle 210 through the orchard. Control system 50 directs vehicle 210 to stop at desired locations in the orchard. When vehicle 210 stops, control system 50 directs each vision system 230 to capture images of one or more trees. Specifically, upper camera 230A and lower camera 230B of one vision system 230 can simultaneously take images of the same area of a tree. Data processing system 51 processes one of the images to identify potential mummies by comparing the images to those in data storage system 52. After potential mummies are identified in the first image, data processing system 51 rectifies the two images and aligns them horizontally. Data processing system 51 then translates the coordinates of the potential mummies in the first image to account for rectification of the images. Data processing system 51 uses the coordinates to define a virtual boundary, such as a square or other shape, around the potential mummies in one image and extracts one or more visual features (such as a hard edge, color change, shape change, etc.) located inside the boundary. Data processing system 51 then searches for the corresponding visual feature or features in the other image. Data processing system 51 then filters the matching visual feature or features and confirms that they appear on the surface of a potential mummy in both images, as opposed to elsewhere in the images. Data processing system 51 then searches for the extracted visual feature or features of the potential mummy from the first image along the same horizontal (epipolar) line in the other image. If data processing system 51 confirms a match (i.e., that both images show a mummy at the same location), data processing system 51 calculates the pixel difference between the two images and determines a raw pixel shift value (i.e., the distance between the pixels of the matched visual feature or features in the two images). Data processing system 51 then determines a conversion factor based on the distance between upper camera 230A and lower camera 230B and converts the raw pixel shift value to a depth estimate. This process is repeated for each potential mummy in the first image. Using the x,y coordinates of the confirmed mummies in the first image and the calculated depth estimate, each mummy is mapped in three dimensional space in relation to the position of removal tool 240. Data processing system 51 then optimizes the targeting position of removal tool 240, and removal tool 240 is used to remove the mummies as described above.

Both vision systems 230 can be utilized simultaneously. The vision systems can take images of the same tree or different trees. The method can also be carried out while vehicle 210 is in motion, as opposed to stopped at a given location.

Although the present invention has been shown and described in detail the same is by way of example only and is not a limitation on the scope of the invention. Various modifications to the embodiments disclosed are possible within the scope of the invention. For example, instead of automatically traveling along a previously mapped path, travel of vehicle 10 can be directly controlled from user interface 70. Vison system 30 and projectile launcher 41 could also be mounted on separate turret and support systems. One or more vision systems 30 and removal tools 40 could be positioned on each side of the vehicle, as opposed to on the front and/or rear of the vehicle. In other embodiments, control system 50 does not generate a report for the user. Rather, user interface 70 can include an app through which the user can submit photos of the orchard (both before and/or after mummy removal or another process has been performed) for analysis and report generation by the app. A user driven vehicle can also be used instead of an autonomous vehicle.

Although embodiments of the invention have been described in connection with removing mummies from almond trees, it is to be understood that the apparatuses and methods of the present invention can be used with other types of agricultural plants, trees, crops and processes. For example, data storage system 52 could be loaded with images of branches that are diseased or of growth patterns that indicate pruning is appropriate, diseased leaves or other foliage, or other conditions or states of a tree, plant, crop, field, or orchard, which can be used by control system 50 to identify such branches, leaves, foliage or other states or conditions of a tree, plant, crop, field or orchard. Instead of launching a pellet, removal tool 40 could tag the appropriate trees, branches, leaves, foliage or other portions of a tree, plant, crop, field or orchard with a paintball or other means of marking. Control system 50 can generate a report showing the locations of the marked trees, branches, leaves, foliage or other portions of a tree, plant, crop, field, or orchard for follow up action such as, for example, pruning or other treatment. The vision systems, controls systems, and removal tools can also be used to target insects, rodents and other pests. For example, data storage system 52 could be loaded with images of mole holes or animal burrows, which control system 50 can use to identify and generate a report of such areas in the field or orchard. These locations or adjacent trees can be marked as described above. In certain embodiments of the invention, the vision system can be replaced by or used in conjunction with a heat sensing system to identify a target. Such a system may be particularly useful for targeting insects, rodents and other pests, including pests inside a mummy, fruit, nut, vegetable or other part of an agricultural crop. Apparatuses and methods of the invention can also be used to perform other agricultural processes, such as thinning crops. The apparatuses and methods of the present invention can also be used to harvest a variety of different fruits, nuts and vegetables, such as, for example, strawberries and peaches. In other embodiments, data storage system 52 is loaded with images of leaking pipes, hoses, or other malfunctioning or damaged equipment, such as, for example, irrigation equipment. Control system 50 can be used to identify such equipment, which can be marked and reported for maintenance.

Apparatuses and methods of the present invention can also be used in non-agricultural settings. For example, the vision systems, control systems, and removal tools can also be used for general object location and targeting functions, including in connection with navigation or weapons and weapons systems. Other modifications are also within the scope of the present invention.

The invention claimed is:

1. A method of managing an agricultural crop, including:
    obtaining, with at least one processor, a map of the crop to be managed;
    utilizing, with the at least one processor, the map and a navigation system to move a vehicle through a field of the crop;
    specifying, with the at least one processor, a type of item to be removed from the crop by storing at least one image of the type of item to be removed in a data storage system;
    capturing, with at least one vision system, an image of a portion of the crop;
    determining, by the at least one processor, whether the captured image includes the type of item to be removed from the crop based, at least in part, on a comparison of the captured image with the stored image;
    aiming, with the at least one processor, a removal tool at the item to be removed from the crop shown in the captured image responsive to the at least one processor determining the captured image includes the type of item to be removed from the crop; and
    attempting to remove the item to be removed from the crop shown in the captured image by activating the removal tool with the at least one processor, wherein the activating the removal tool launches a projectile at the item to be removed from the crop shown in the captured image with sufficient force to dislodge the item to be removed from the crop.

2. The method of managing an agricultural crop according to claim 1, wherein the removal tool is aimed by utilizing a LIDAR system to obtain a three dimensional image of the item to be removed shown in the captured image and overlaying the three dimensional image on the captured image.

3. The method of managing an agricultural crop according to claim 1, further including determining the expected vertical drop of the projectile as it travels toward the item to be removed from the crop shown in the captured image and aiming the removal tool to account for the expected drop.

4. The method of managing an agricultural crop according to claim 1, further including downloading the map to the vehicle.

5. The method of managing an agricultural crop according to claim 1, wherein the map includes a predetermined route for the vehicle to follow.

6. The method of managing an agricultural crop according to claim 1, further including storing in the data storage system an image of a second type of item other than the type of item to be removed from the crop.

7. The method of managing an agricultural crop according to claim 6, further including comparing the captured image to the image of the second type of item to determine if the captured image includes the second type of item.

8. The method of managing an agricultural crop according to claim 1, further including storing the captured image in the data storage system.

9. The method of managing an agricultural crop according to claim 1, further including capturing a second image of the portion of the crop, determining whether the item to be removed from the crop has been dislodged therefrom by comparing the second captured image to the captured image, and responsive to determining the item to be removed from the crop has not been dislodged therefrom on the first activation of the removal tool, activating the removal tool a second time to attempt to dislodge the item to be removed from the crop.

10. The method of managing an agricultural crop according to claim 9, wherein the image of the item to be removed is stored in the data storage system if the item to be removed from the crop shown in the first captured image was not removed.

11. The method of managing an agricultural crop according to claim 10, further including analyzing the image of the item to be removed from the crop to determine whether the item to be removed is erroneous and identifying the image of the item to be removed in the data storage system as an item type that should not be targeted for removal in the future.

12. The method of managing an agricultural crop according to claim 1, further including utilizing the vision system to obtain information about the crop as the vehicle moves through the field of the crop.

13. The method of managing an agricultural crop according to claim 12, further including generating a report of a condition of the crop.

14. The method according to claim 1, further including generating a report of activities carried out by the vehicle.

15. The method of managing an agricultural crop according to claim 1, wherein the projectile is a biodegradable pellet.

16. A method of managing an agricultural crop, including:
    obtaining a map of the crop to be managed;
    utilizing the map and a navigation system to move a vehicle through a field of the crop;
    specifying a type of item to be removed from the crop;
    storing an image of the type of item to be removed in a data storage system;
    capturing a first image of a portion of the crop with a first camera;
    capturing a second image of the portion of the crop with a second camera;
    comparing the first image with the stored image to determine whether the first image includes the type of item to be removed from the crop;
    if the first image includes the type of item to be removed from the crop:
    determining x, y coordinates of the item to be removed from the crop in the first image;
    rectifying the first image and the second image;
    aligning the first image and the second image horizontally;
    translating the x, y coordinates of the item to be removed from the crop in the first image to account for rectification of the images;
    defining a virtual boundary around the item to be removed from the crop in the first image;
    extracting a visual feature located inside the boundary;
    reviewing the second image for a visual feature corresponding to the visual feature extracted from the first image;
    if the second image includes the visual feature corresponding to the visual feature extracted from the first image, filtering the corresponding visual features and confirming that the matching visual features appear on the surface the item to be removed from the crop in both images;

determining if the corresponding visual features appear on a common horizontal line in the first and second images, and if so, calculating the pixel difference between the first image and the second image and determining a raw pixel shift value;

determining a conversion factor and converting the raw pixel shift value to a depth estimate;

mapping in three dimensional space a location of the item to be removed from the crop shown in the first image in relation to the position of a removal tool based on the x, y coordinates of the item to be removed from the crop and the depth estimate;

aiming the removal tool at the item to be removed from the crop shown in the first image; and attempting to remove the item to be removed from the crop shown in the first image by activating the removal tool, wherein the activating the removal tool launches a projectile at the item to be removed from the crop shown in the first image with sufficient force to dislodge the item to be removed from the crop.

17. The method of managing an agricultural crop according to claim 16, wherein the first image and the second image are captured simultaneously.

18. The method of managing an agricultural crop according to claim 16, further including determining the expected vertical drop of the projectile as it travels toward the item to be removed from the crop shown in the first image and aiming the removal tool to account for the expected drop.

19. The method of managing an agricultural crop according to claim 16, further including downloading the map to the vehicle.

20. The method of managing an agricultural crop according to claim 16, wherein the map includes a predetermined route for the vehicle to follow.

21. The method of managing an agricultural crop according to claim 16, further including storing in the data storage system an image of a second type of item other than the type of item to be removed from the crop.

22. The method of managing an agricultural crop according to claim 21, further including comparing the first image to the image of the second type of item to determine if the first image includes the second type of item.

23. The method of managing an agricultural crop according to claim 16, further including storing the first image in the data storage system.

24. The method of managing an agricultural crop according to claim 16, further including capturing a third image of the portion of the crop and comparing the third image to the first image to determine if the item to be removed from the crop shown in the first image was removed by the removal tool, further including activating the removal tool a second time if the item to be removed from the crop shown in the first image was not removed by the first activation of the removal tool.

25. The method of managing an agricultural crop according to claim 24, wherein the image of the item to be removed is stored in the data storage system if the item to be removed from the crop shown in the first image was not removed.

26. The method of managing an agricultural crop according to claim 25, further including analyzing the image of the item to be removed from the crop to determine whether the item to be removed is erroneous and identifying the image of the item to be removed in the data storage system as an item type that should not be targeted for removal in the future.

27. The method of managing an agricultural crop according to claim 16, further including utilizing a vision system to obtain information about the crop as the vehicle moves through the field of the crop.

28. The method of managing an agricultural crop according to claim 27, further including generating a report of a condition of the crop.

29. The method according to claim 16, further including generating a report of activities carried out by the vehicle.

* * * * *